(12) United States Patent
Miyamoto

(10) Patent No.: US 10,095,383 B2
(45) Date of Patent: Oct. 9, 2018

(54) DISPLAY/INPUT DEVICE, IMAGE FORMING APPARATUS, AND METHOD FOR CONTROLLING A DISPLAY/INPUT DEVICE

(71) Applicant: KYOCERA Document Solutions Inc., Osaka (JP)

(72) Inventor: Keita Miyamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 374 days.

(21) Appl. No.: 14/958,311

(22) Filed: Dec. 3, 2015

(65) Prior Publication Data
US 2016/0179301 A1    Jun. 23, 2016

(30) Foreign Application Priority Data
Dec. 22, 2014   (JP) .................. 2014-258721

(51) Int. Cl.
G03G 15/00   (2006.01)
H04N 1/00   (2006.01)
(Continued)

(52) U.S. Cl.
CPC ......... *G06F 3/0482* (2013.01); *G03G 15/502* (2013.01); *G06F 3/0484* (2013.01);
(Continued)

(58) Field of Classification Search
CPC .. G06F 3/0482; G06F 3/0484; G06F 3/04842; G06F 3/04847; G06F 3/0485;
(Continued)

(56) References Cited

U.S. PATENT DOCUMENTS 6,940,532 B1 *  9/2005  Fukui .................. G06F 3/04855
                                                715/784
2007/0078599 A1 *  4/2007  Yoshioka ............. G01C 21/367
                                                701/454
(Continued)

FOREIGN PATENT DOCUMENTS

EP   2 090 972 A2   12/2008
JP   2010-86519 A    4/2010
JP   2012-208645 A  10/2012

OTHER PUBLICATIONS

European Office Action with extended search report issued by the European Patent Office, dated May 6, 2016 in corresponding application 15197650.3.
(Continued)

*Primary Examiner* — Shourjo Dasgupta
(74) *Attorney, Agent, or Firm* — Stein IP, LLC

(57) ABSTRACT

A display/input device has a display panel, a touch panel portion, and a control portion. The display panel displays a plurality of item selection screens including selection keys for setting items. The control portion makes the display panel display item selection screens of different pages according to user operation, and recognizes a fixed key, which is a selection key on which a fixing operation has been made. When a first determination operation is done when the fixing operation is undone, the control portion makes the display panel display the item selection screen that includes the selection keys that were being displayed when the fixing operation was undone. When a second determination operation is done when the fixing operation is undone, the control portion makes the display panel display the item selection screen in which the fixing operation was made.

10 Claims, 7 Drawing Sheets

(51) Int. Cl.
  *G06F 3/0482* (2013.01)
  *G06F 3/0484* (2013.01)
  *G06F 3/0485* (2013.01)
  *G06F 3/0488* (2013.01)
  *G06F 3/12* (2006.01)

(52) U.S. Cl.
  CPC ........ *G06F 3/0485* (2013.01); *G06F 3/04842* (2013.01); *G06F 3/04847* (2013.01); *G06F 3/04883* (2013.01); *G06F 3/04886* (2013.01); *G06F 3/1203* (2013.01); *H04N 1/00411* (2013.01); *H04N 1/00419* (2013.01); *H04N 1/00435* (2013.01); *H04N 1/00474* (2013.01); *H04N 1/00482* (2013.01); *G03G 2215/0132* (2013.01); *H04N 2201/0094* (2013.01)

(58) Field of Classification Search
  CPC ............. G06F 3/04883; G06F 3/04886; G06F 3/1203; G03G 15/502; G03G 2215/0132; H04N 1/00411; H04N 1/00419; H04N 1/00435; H04N 1/00474; H04N 1/00482; H04N 2201/0094
  See application file for complete search history.

(56) References Cited

U.S. PATENT DOCUMENTS

| | | | |
|---|---|---|---|
| 2008/0094370 A1* | 4/2008 | Ording | G06F 3/04883 345/173 |
| 2009/0043494 A1* | 2/2009 | Han | G01C 21/20 701/454 |
| 2009/0153589 A1* | 6/2009 | Haneda | G09G 3/3406 345/684 |
| 2009/0187842 A1* | 7/2009 | Collins | G06F 3/0482 715/769 |
| 2009/0190153 A1 | 7/2009 | Nakanishi | 358/1.13 |
| 2009/0210810 A1 | 8/2009 | Ryu et al. | 715/769 |
| 2010/0053221 A1 | 3/2010 | Kaneko et al. | 345/684 |
| 2010/0120470 A1* | 5/2010 | Kim | G06F 1/1615 455/566 |
| 2011/0083105 A1 | 4/2011 | Shin et al. | 715/830 |
| 2012/0174026 A1 | 7/2012 | Shim et al. | 715/784 |
| 2012/0278755 A1* | 11/2012 | Lehmann | G09G 5/34 715/784 |
| 2013/0145267 A1* | 6/2013 | Ramachandran | G06F 3/04883 715/719 |
| 2013/0283204 A1* | 10/2013 | Pasquero | G06F 3/0484 715/784 |
| 2014/0015786 A1 | 1/2014 | Honda | 345/173 |
| 2015/0319114 A1* | 11/2015 | Efrati | H04W 4/14 715/752 |
| 2016/0170576 A1* | 6/2016 | Brown | G06F 3/0482 715/784 |

OTHER PUBLICATIONS

Japanese Office Action dated Jul. 19, 2016, issued by the Japanese Patent Office in corresponding application JP 2014-258721.

* cited by examiner

DISPLAY/INPUT DEVICE, IMAGE FORMING APPARATUS, AND METHOD FOR CONTROLLING A DISPLAY/INPUT DEVICE

INCORPORATION BY REFERENCE

This application is based upon and claims the benefit of priority from the corresponding Japanese Patent Application No. 2014-258721 filed on Dec. 22, 2014, the entire contents of which are incorporated herein by reference.

BACKGROUND

The present disclosure relates to a display/input device including a display panel and a touch panel. The present disclosure relates also to an image forming apparatus incorporating such a display/input device.

On an information processing device such as a computer, a particular object (image) can be specified by use of a device such as a mouse or a touch panel. For example, a process can be executed to move the specified object to a desired position within image data. An information processing device as described below is known which allows specification of an object.

Specifically, in a known information processing device, an object is displayed; specification of a plurality of positions on display means is recognized; the position (first position) at which one of a plurality of objects is displayed is recognized; while a position (second position) where a specified object is not being displayed is recognized, when movement of the second position is detected, the objects other than the specified object are scrolled.

An image forming apparatus such as a copier, a multi-function peripheral, a printer, or a facsimile machine is often provided with an operation panel (display/input device). The operation panel is provided with a display portion (display panel) for displaying screens and a touch panel. Through detection of operation on software keys displayed in screens, setting operations by a user are accepted.

On the operation panel of an image forming apparatus, a user makes an operation to select a job to be executed, makes an operation to select a setting item for the selected job, and enters a setting value for the selected setting item. On the display panel are displayed a screen for selection of a job, a screen for selection of a setting item, and a screen for entry of a setting value for the selected setting item. By making touch operations on software keys displayed in each screen, the user makes settings to obtain desired results.

Here, as image forming apparatuses evolve in functionality, a large number of setting items related to jobs are available; as for screens for selection of setting items alone, there are provided a plurality of them. A user first goes through all the screens to get an idea of which setting items can be selected on which screens and then proceeds to make settings. Here, the user switches from one screen for selecting a setting item to another while checking them; thereafter, the user selects setting items and sets setting values. During this checking procedure, the user has to switch screens repeatedly to and fro to select setting items, thus requiring troublesome operation. Also to confirm the setting values that have been set, the user again has to switch screens repeatedly to and fro.

With the known information processing device mentioned above, what is achieved is simply to switch background screens according to a scroll operation while keeping the specified object at a fixed position; a user cannot jump (switch) to a desired screen by a simple operation. Moreover, to grasp the entire image data, the user needs to look over the entire image data by continuing the scroll operation; this requires the user to switch screens repeatedly to and fro. Thus, no solution to troublesome operation is obtained.

SUMMARY

According to one aspect of the present disclosure, a display/input device includes a display panel, a touch panel portion, and a control portion. The display panel displays a plurality of kinds of item selection screens including a plurality of selection keys for selection of a setting item for which to make a setting. The touch panel portion accepts user operation. The control portion, on recognizing based on an output from the touch panel portion a prescribed switching operation being done, makes the display panel display an item selection screen of a different page anew. The control portion recognizes based on an output from the touch panel portion a prescribed fixing operation on a displayed selection key and a thereby fixed key, which is the selection key on which the fixing operation has been done, so that, on recognizing based on an output from the touch panel portion a prescribed first determination operation when the fixing operation is undone, the control portion makes the display panel display, with no selection key fixed, an item selection screen that includes selection keys that were being displayed when the fixing operation was undone and, on recognizing based on an output from the touch panel portion a prescribed second determination operation when the fixing operation is undone, the control portion makes the display panel display an item selection screen in which the fixing operation was done.

Further features and advantages of the present disclosure will become apparent from the description of embodiments given below.

DETAILED DESCRIPTION

Figure 1:
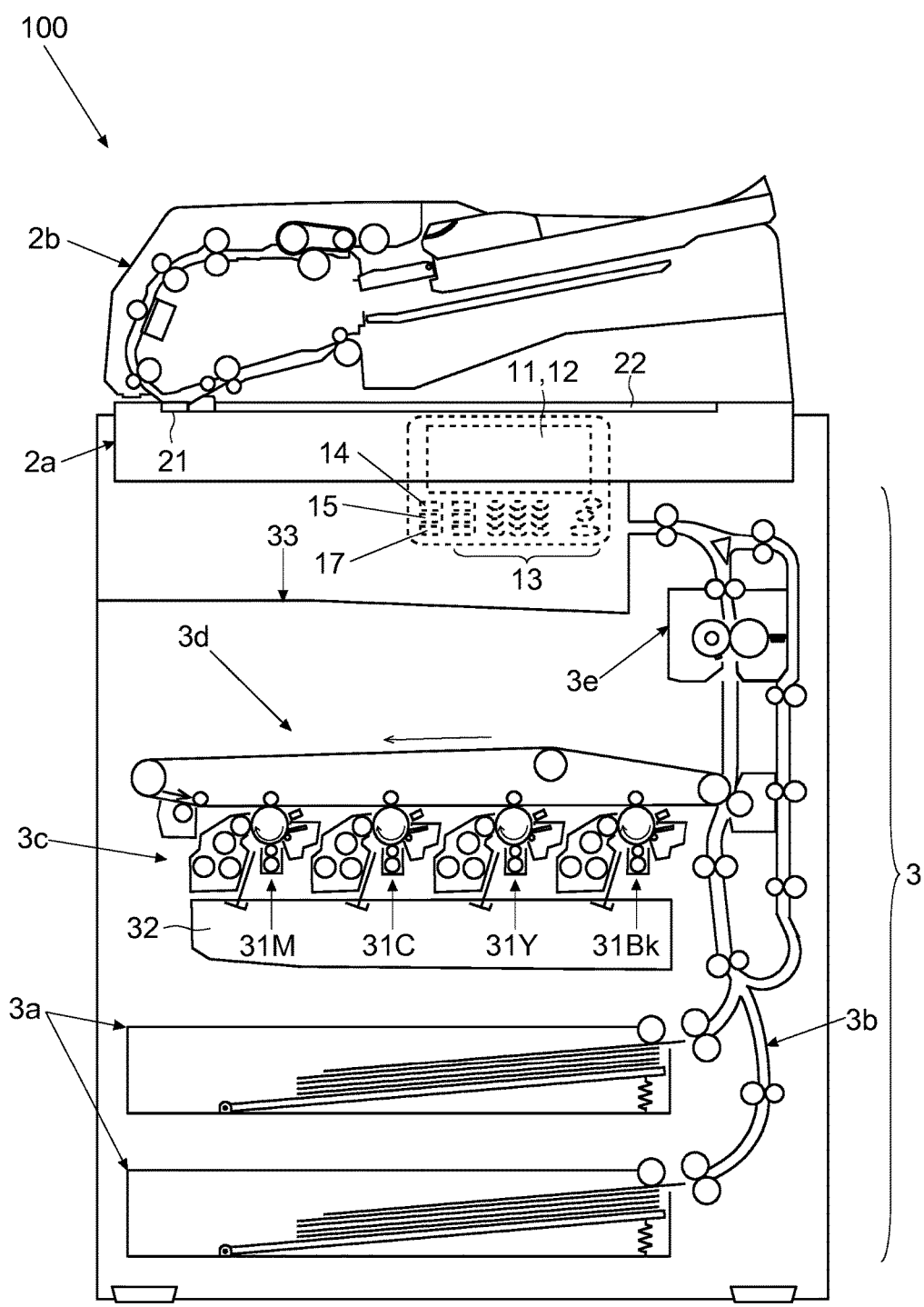
FIG. 1 is a diagram showing one example of a multifunction peripheral according to one embodiment.

According to the present disclosure, a key for selecting a setting item for which a user wants to make a setting can be "fixed" (kept displayed as long as the user likes); on undoing the fixing, the user can return to a desired screen by a simple operation. This helps enhance user-friendliness. An embodiment of the present disclosure will now be described with reference to FIGS. 1 to 7. The following description deals with, as an example of a display/input device, an operation panel 1 provided in a multifunction peripheral 100 (corresponding to an image forming apparatus). None of the features of the embodiment in terms of structure, arrangement, etc. is meant to restrict the scope of the present disclosure; they are all merely illustrative.

(Construction of a Multifunction Peripheral 100)

First, with reference to FIGS. 1 and 2, an outline of a multifunction peripheral 100 according to one embodiment will be described.

The multifunction peripheral 100 has, in an upper part, an image reading portion 2a, a document transport portion 2b, and an operation panel 1. The document transport portion 2b transports, out of a document placed, one sheet after another sequentially to a reading position (a feed-reading contact glass 21) in the image reading portion 2a. The document transport portion 2b can be opened and closed by being swung at the front about a pivot (unillustrated) provided at the rear with respect to the plane of FIG. 1. A document in the form of a book can be placed on a stationary-reading contact glass 22. The image reading portion 2a reads a document transported, or a document placed. The image reading portion 2a then generates image data of the document. The generated image data of the document is used for copying and transmission.

The multifunction peripheral 100 includes, inside it, a printing portion 3. The printing portion 3 includes a sheet feed portion 3a, a transport portion 3b, an image forming portion 3c, an intermediary transfer portion 3d, and a fixing portion 3e. The sheet feed portion 3a feeds sheets used for printing. The transport portion 3b transports sheets inside the apparatus. The image forming portion 3c includes image forming units 31Bk, 31Y, 31C, and 31M for different colors (black, yellow, cyan, and magenta) and an exposure device 32 for exposing photosensitive drums provided respectively in the image forming units 31Bk to 31M to light. The image forming units 31Bk, 31Y, 31C, and 31M and the exposure device 32 generate toner images of the respective colors based on the image data. The toner images generated by the respective image forming units are primarily transferred to the intermediary transfer portion 3d, which then secondarily transfers those toner images to a sheet fed from the sheet feed portion 3a. The fixing portion 3e fixes the toner images transferred to the sheet. The transport portion 3b discharges the sheet having passed through the fixing portion 3e onto a discharge tray 33.

The operation panel 1 serves as a display/input device that allows setting of jobs that use the functions of the image forming apparatus, such as printing, transmission, and document reading. On the operation panel 1, a user can select a kind of job (function), such as a copy function and a scan-and-send function, out of the functions of the multifunction peripheral 100; the user can also selects a setting item available for the selected job; the user can also set a setting value for the selected selling item.

As shown in FIG. 1, the operation panel 1 is provided in a top front part of the multifunction peripheral 100. The operation panel 1 includes a display panel 11. The display panel 11 is a liquid crystal display panel. Any other type of display panel can be used. The operation panel 1 displays software keys (buttons) with which a user can select a kind of job to be executed, select a setting item, set a setting value, complete setting, cancel setting, and request execution of a job; the user makes settings by operating the software keys displayed on the display panel 11 (by touching the display positions of those software keys).

On the top face of the display panel 11, a touch panel portion 12 is provided for accepting user operation. The touch panel portion 12 includes circuitry for detecting a touched position, or touched coordinates. The touch panel portion 12 can be one that can simultaneously detect touch at a plurality of points (e.g., of a capacitive type). The operation panel 1 also includes a plurality of hardware keys 13. The hardware keys 13 include a numerical key pad for entry of numerals and a Start key for instructing to start executing a job; also included are keys for selecting different functions, such as a Copy key 14 which a user presses to invoke a copy function and a Send key 15 which a user presses to invoke a transmission function such as a facsimile function.

Figure 2:
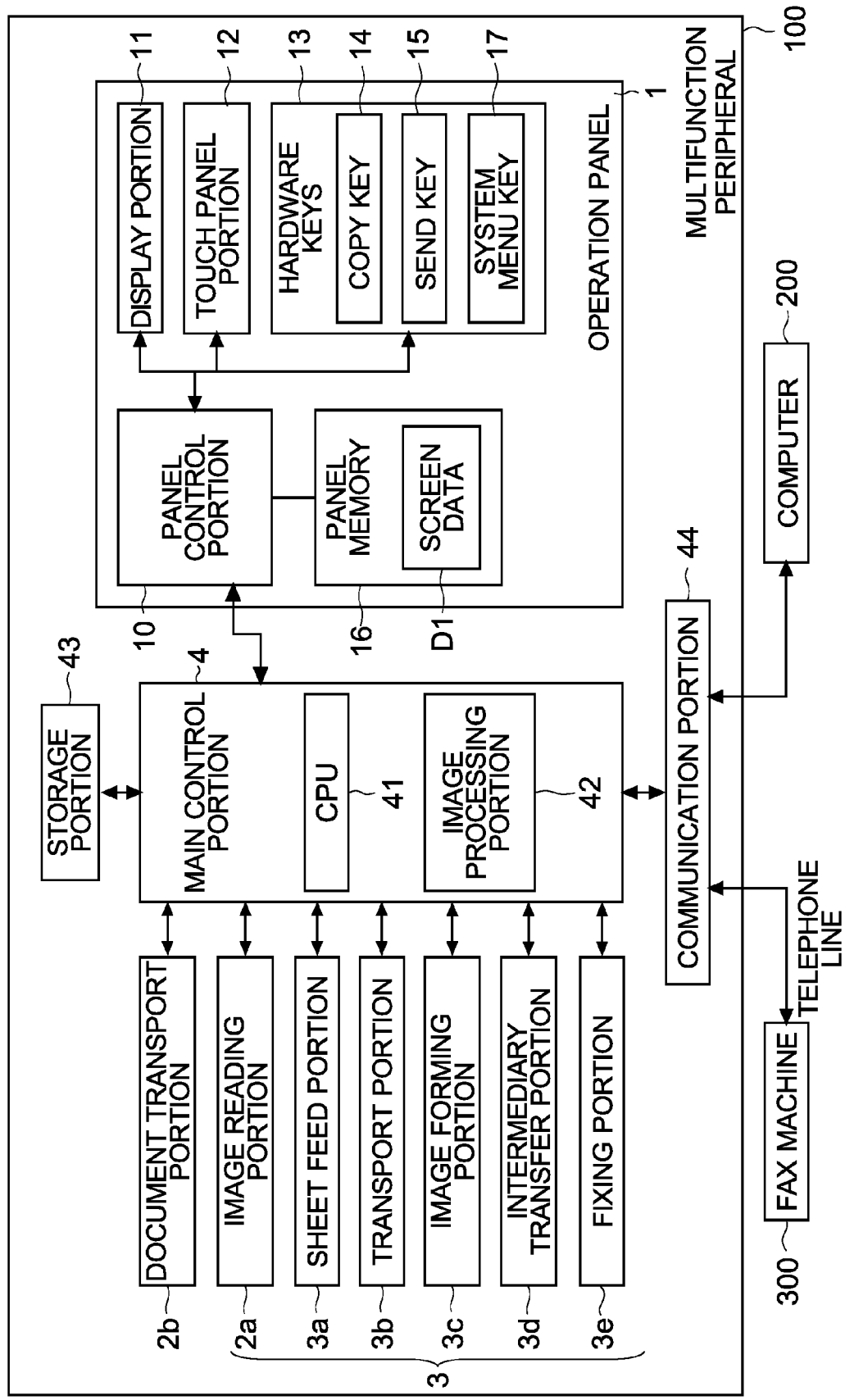
FIG. 2 is a diagram showing one example of the hardware configuration of a multifunction peripheral according to one embodiment.

As shown in FIG. 2, the multifunction peripheral 100 includes, inside it, a main control portion 4. The main control portion 4 controls different parts of the multifunction peripheral 100 in a concentrated fashion. The multifunction peripheral 100 includes an operation panel 1, an image reading portion 2a, a document transport portion 2b, and a printing portion 3 (a sheet feed portion 3a, a transport portion 3b, an image forming portion 3c, and a intermediary transfer portion 3d).

The main control portion 4 includes circuitry for data and other processing, such as a CPU 41 and an image processing portion 42. The CPU 41 performs data processing based on control programs and control data stored in a storage portion 43 to control different parts of the multifunction peripheral 100. The main control portion 4 can be divided into separate sections on a function-by-function basis, such as a circuit board for overall control and image processing and a circuit board for controlling the printing portion 3. The image processing portion 42 performs image processing on image data fed to the multifunction peripheral 100 (e.g., data read by the image reading portion 2a, or data received by a communication portion 44). The data processed by the image processing portion 42 is used by the image forming portion 3c to form toner images, is stored in the storage portion 43, or is transmitted from the communication portion 44 to a computer 200 or to a facsimile machine 300.

The storage portion 43 is communicably connected to the main control portion 4. The storage portion 43 includes a volatile storage device, such as a RAM, and a non-volatile storage device, such as a ROM and a HDD. The storage portion 43 can store programs for controlling the multifunction peripheral 100 along with various kinds of data such as control data, setting data, and image data.

The main control portion 4 is communicably connected to a communication portion 44 (communication interface) including various connectors, sockets, a facsimile modem, etc. The communication portion 44 is communicably connected over a network or a public telephone line to a plurality of external computers 200 (PCs and servers) and facsimile machines 300 (only one each is shown in FIG. 2 for convenience' sake). The communication portion 44 can transmit image data resulting from document reading by the image reading portion 2a to a computer 200 or a receiving-side facsimile machine 300 (a scan-and-send function). The communication portion 44 also permits printing based on image data transmitted from a computer 200 or a sending-side facsimile machine 300 to be fed to the multifunction peripheral 100 (a printer function, a facsimile function).

The main control portion 4 is communicably connected to the operation panel 1. The main control portion 4 receives from the operation panel 1 signals conveying what is entered and set on the operation panel 1. The main control portion 4 controls the printing portion 3, the document transport portion 2b, the image reading portion 2a, the communication portion 44, and the storage portion 43 so that a job will be executed according to the settings made by a user.

Specifically, the operation panel 1 includes a panel control portion 10, a panel memory 16, a display panel 11, a touch panel portion 12, hardware keys 13 (a numerical keypad, a Start key, a Copy key 14, and a Send key 15).

The panel control portion 10 includes a CPU, an IC, and a driver circuit for the display panel 11 (liquid crystal display panel). The panel control portion 10 controls what is displayed on the display panel 11. The panel control portion 10 also receives an output from the touch panel portion 12 to recognize the position (coordinates) operated (touched) on the display panel 11 (touch panel portion 12). A set of table data that defines the correlation between the output of the touch panel portion 12 and the position (coordinates) is stored in the panel memory 16. The panel control portion 10 compares the pressed position with the image data of the screen being displayed on the display panel 11 in order to recognize the software key operated on the screen. The panel control portion 10 also receives signals from the hardware keys 13 to recognize whichever of the hardware keys 13 is pressed.

The panel memory 16 provided in the operation panel 1 stores screen data D1 for display of various screens. The screen data D1 includes various kinds of data used to display various screens, specifically background image data, frame image data, image data of software keys displayed on screens, characters (text data) for indicating messages, guidance, setting items, and setting values, and data defining display positions of images and text. According to operations made on the touch panel portion 12 (operations on software keys arranged in different screens) and on the hardware keys 13, the panel control portion 10 reads, out of the screen data D1, the data needed to display the subsequent screen, and makes the display panel 11 switch screens.

(Selecting a Setting Item with No Selection Key 5 Fixed)

Next, with reference to FIG. 3, a description will be given of how a setting item is selected with no selection key 5 fixed on the operation panel 1.

On the operation panel 1, there are arranged keys that allow selection of a job to be executed (a function to be used), such as the Copy key 14 and the Send key 15. A user presses one of those keys to select a job to be executed. The initial screen (the highest screen in hierarchy) of the operation panel 1 can be furnished with software keys that allow selection of a function to be used.

Based on an output from the touch panel portion 12 or a signal from the hardware keys 13, the panel control portion 10 recognizes the kind of job selected by a user. The panel control portion 10 then makes the display panel 11 display a screen (item selection screen 6) that allows selection of a setting item available for the selected kind of job. For example, when a copy function is selected, the panel control portion 10 has a screen displayed that allows selection of a setting item related to the copy function (see FIG. 3). For another example, when a transmission function is selected, the panel control portion 10 has a screen displayed that allows selection of a setting item related to the transmission function (see FIG. 3).

On the operation panel 1, a System Menu key 17 is arranged. To configure the basic operation of the multifunction peripheral 100, a user presses the System Menu key. Pressing the System Menu key 17 permits the user to choose the preferred language, make settings related to a network, and set default values for setting items related to the job. The initial screen (the highest screen in hierarchy) of the operation panel 1 can be furnished with a software key that allows a choice of system configuration.

When, based on an output from the touch panel portion 12 or a signal from the hardware keys 13, the panel control portion 10 recognizes a user's choice of system configuration, the panel control portion 10 makes the display panel 11 display a screen (item selection screen 6) that allows selection of a setting item available for system configuration.

In this way, on the operation panel 1, a screen can be displayed that allows selection of a settable item. A user selects a setting item and sets a setting value on the screen for the selected setting item so that he will obtain desired results. For example, when a user wants to perform double-side printing, he selects a copy function and then selects a setting item related to double-side printing; then, on the screen for the setting item related to double-side printing, the user makes a specific setting for double-side printing by operating software keys.

Now, with reference to FIG. 3, an example of item selection screens 6 will be described. FIG. 3 and the following description deal with, as an example, item selection screens 6 that are displayed when copying is selected as a job to be executed. For a transmission job and system configuration respectively, similar item selection screens 6 are in store, of which, however, no detailed description will be given.

Figure 3:
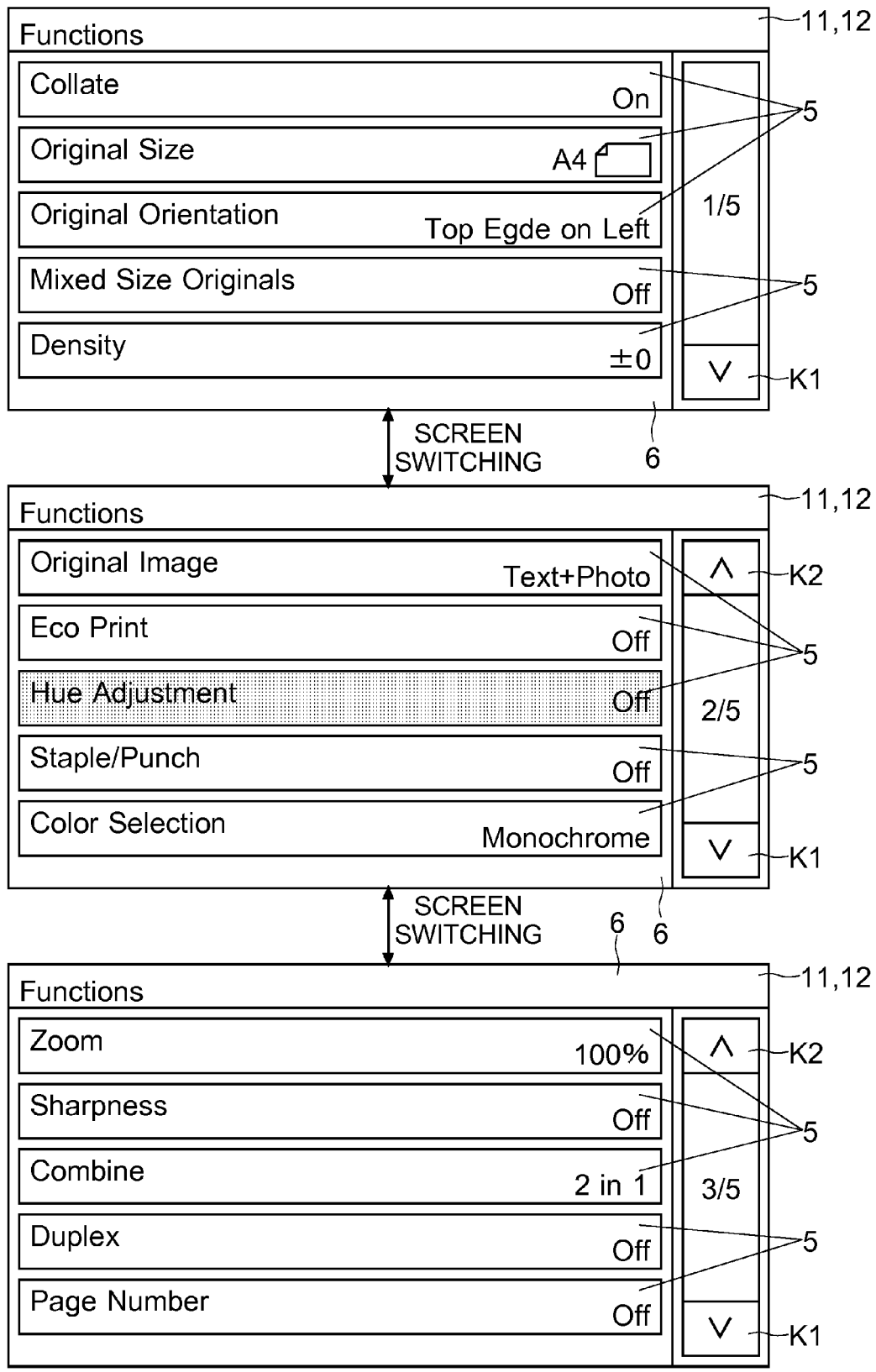
FIG. 3 is a diagram showing one example of switching of item selection screens on an operation panel according to one embodiment.

FIG. 3 shows item selection screens 6 that are displayed when no selection key 5 for selecting a setting item is being fixed. The panel control portion 10 displays a plurality of selection keys 5 in each item selection screen 6. Each selection key 5 is in a rectangular shape of which the lengthwise direction runs horizontally. The panel control portion 10 makes the display panel 11 display the plurality of selection keys 5 in a vertical row. On the operation panel 1 according to the embodiment, five selection keys 5 are displayed in each item selection screen 6. The number of selection keys 5 displayed in one item selection screen 6 can be six or more, or one or more but four or less. The selection keys 5 are for selecting setting items; accordingly, the selection keys 5 displayed in an item selection screen 6 correspond to different setting items.

The panel control portion 10 makes the display panel 11 display, inside each selection key 5, the name of the corresponding setting item at left. The panel control portion 10 makes the display panel 11 display, inside each selection key 5, the current setting value for the corresponding setting item at right. For each setting item, a default setting value is prescribed. When an item selection screen 6 is displayed for the first time, default setting values are displayed. The panel memory 16 and the storage portion 43 store data containing the default setting values for setting items.

Based on an output from the touch panel portion 12, the panel control portion 10 recognizes a touch on a selection key 5. The panel control portion 10 thus recognizes selection of the setting item corresponding to (marked on) the touched selection key 5. When, in the item selection screen 6 in the top tier in FIG. 3, the selection key 5 for the setting item "Original Size" is touched, the panel control portion 10 recognizes selection of the setting item as to document size. The panel control portion 10 then makes the display panel 11 display a setting screen directed to document size.

On completion of the setting of a setting value in the screen (the screen for the selected setting item) that appeared in response to the operation on the selection key 5, the panel control portion 10 makes the display panel 11 display the item selection screen 6 that was being displayed when the selection key 5 was displayed (returns to the previous screen).

One selection key 5 corresponds to one setting item, and there are many setting items. Thus, a single item selection screen 6 does not accommodate the selection keys 5 for all setting items. Accordingly, a plurality of item selection screens 6 are in store. A selection key 5 corresponding to a given setting item is included in one of a plurality of pages of item selection screens 6. FIG. 3 shows first three pages out of a total of five pages of item selection screens 6. Of the three item selection screens 6 shown in FIG. 3, the one in the top tier is the first (page-1) item selection screen 6; the one in the middle tier is the second (page-2) item selection screen 6; and the one in the bottom tier is the third (page-3) item selection screen 6.

The order of setting items (the order in which selection keys 5 for different setting items are displayed) is prescribed. Specifically, with no selection key 5 fixed, the page-1 item selection screen 6 shows selection keys 5 in the first to fifth positions in order; the page-1 item selection screen 6 shows selection keys 5 corresponding to the setting items "Original Size", "Density", etc. In the example shown in FIG. 3, "Collate" is in the first position in order, "Original Size" is in the second position in order, and "Density" is in the fifth position in order (for other items, see the top tier in FIG. 3).

With no selection key 5 fixed, the page-2 item selection screen 6 shows selection keys 5 in the sixth to tenth positions in order; the page-2 item selection screen 6 shows selection keys 5 corresponding to the setting items "Eco Pint", "Hue Adjustment", etc. Here, "Eco Print" is in the seventh position in order, and "Hue Adjustment" is in the eighth position in order (for other items, see the middle tier in FIG. 3).

With no selection key 5 fixed, the page-3 item selection screen 6 shows selection keys 5 in the 11th to 15th positions; the page-3 item selection screen 6 shows selection keys 5 corresponding to the setting items "Zoom", "Sharpness", etc. Here, the setting item "Zoom" is in the 11th position in order, and the setting item "Sharpness" is in the 12th position in order (for other items, see the bottom tier in FIG. 3).

Moreover, with no selection key 5 fixed, the panel control portion 10 makes the display panel 11 display, in a box in a right-hand part of each item selection screen 6, an indication "(the page number of the currently shown item selection screen 6)/(the total number of pages of item selection screens 6)". FIG. 3 shows an example where five pages of item selection screens 6 are in store.

Also provided in each item selection screen 6 are switch keys for switching the item selection screen 6 displayed. The switch keys include a Next Page key K1 and a Previous Page key K2. The Next Page key K1 is for switching to the item selection screen 6 of the next page. The Previous Page key K2 is for switching to the item selection screen 6 of the previous page. The item selection screen 6 of the first page shows a Next Page key K1 (see FIG. 3). The item selection screens 6 of the second to the last-but-one pages show a Next Page key K1 and a Previous Page key K2 (see FIG. 3). The item selection screen 6 of the last page shows a Previous Page key K2.

The panel control portion 10 recognizes a touch on a switch key (a prescribed switching operation) based on an output from the touch panel portion 12. Based on an output from the touch panel portion 12, on recognizing a press on the Previous Page key K2, the panel control portion 10 makes the display panel 11 display the item selection screen 6 of the page previous to the currently displayed item selection screen 6; on recognizing a press on the Next Page key K1, the panel control portion 10 makes the display panel 11 display the item selection screen 6 of the page next to the currently displayed item selection screen 6.

By operating the switch keys, a user can check out what setting items are available. The user then operates the selection key 5 corresponding to a desired setting item. On the screen displayed when the setting item is selected, the user then sets a setting value for the selected setting item.

(Fixing a Selection Key 5, and Switching Item Selection Screens 6 with a Selection Key 5 Fixed)

Next, with reference to FIG. 4, a description will be given of fixing of a selection key 5 and switching of item selection screens 6 on the operation panel 1 according to the embodiment.

With the operation panel 1 and the multifunction peripheral 100, it is possible to fix a selection key 5 so that the fixed selection key 5 is shown in different item selection screens 6.

First, a description will be given of a fixing operation for setting a given selection key 5 as a fixed key. Any operation can be defined as the fixing operation; in the operation panel 1 according to the embodiment, the fixing operation is an operation of holding down the selection key 5 (keeping it pressed for a while). Based on an output from the touch panel portion 12, when part of the region of a selection key 5 is held down for a predetermined period (e.g., 0.5 to several seconds), the panel control portion 10 recognizes that selection key 5 as a fixed key 7. In other words, based on an output from the touch panel portion 12, the panel control portion 10 recognizes the holding down of a selection key 5 as a fixing operation. Thus, a fixed key 7 can be set simply by holding a key down.

On recognizing, based on an output from the touch panel portion 12, that a switching operation is done while a fixing operation is maintained, the panel control portion 10 makes the display panel 11 display the fixed key 7 in the item selection screen 6 that appears after the switching (the item selection screen 6 of a different page). Here, the panel control portion 10 keeps the fixed key 7 displayed at the same display position before and after the switching. In this way, so long as a fixing operation is maintained, a given key can be kept displayed in different item selection screens 6; a key (fixed key 7) corresponding to an item for which a setting is likely to be made can be displayed constantly. Put conversely, a fixed key 7 is displayed constantly so long as a fixing operation is maintained. That is, a key is fixed temporarily, and this can be achieved with no overwriting of the content of the original (default) screens of a shared apparatus like an image forming apparatus (multifunction peripheral 100). Thus, a user is saved from the confusion that he would suffer when the content of item selection screens 6 changed every time an operation for fixing a key was done.

Figure 4:
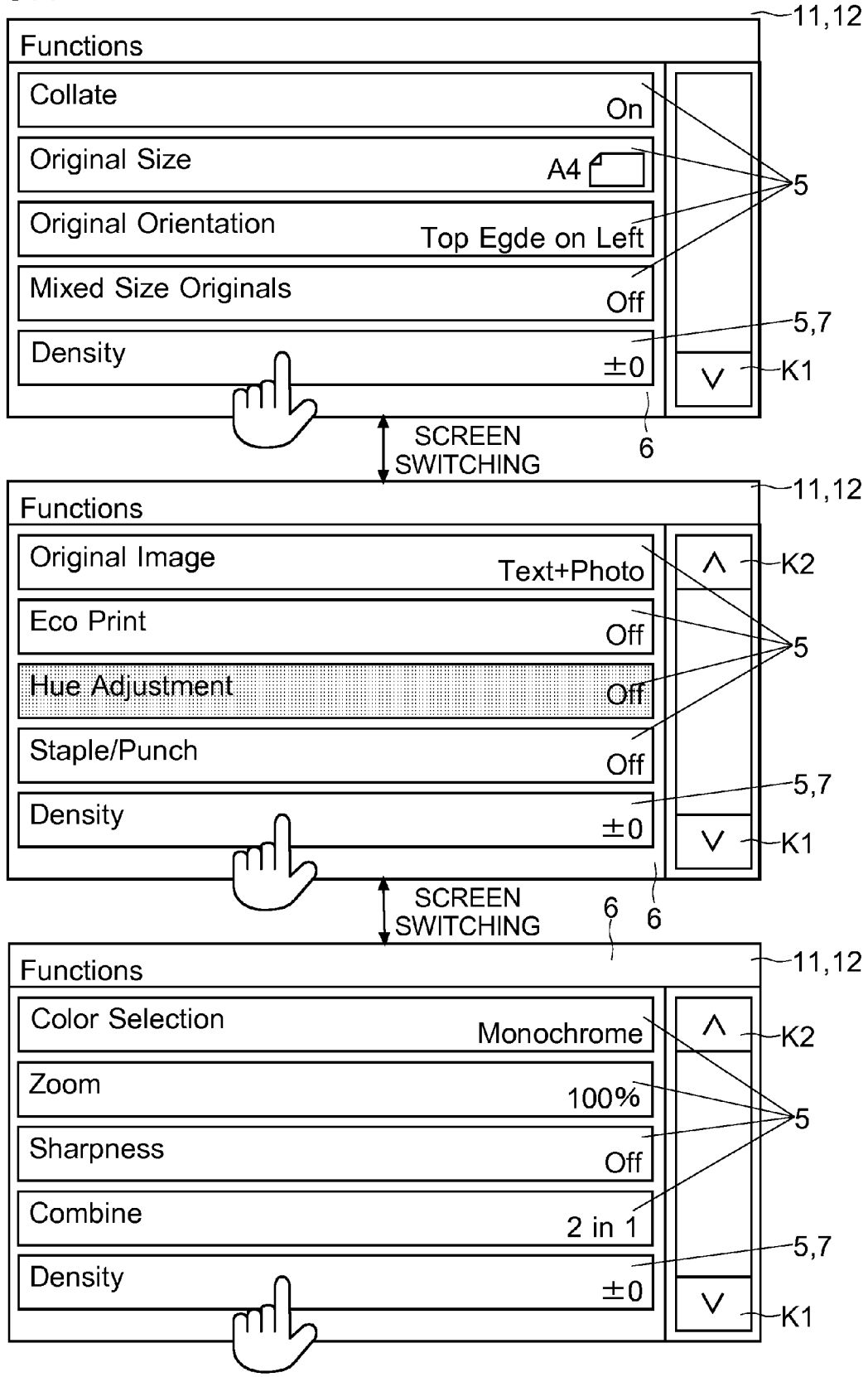
FIG. 4 is a diagram showing one example of switching of item selection screens with a particular selection key fixed.

FIG. 4 shows an example in which, while a fixing operation on the selection key 5 corresponding to the setting item "Density" is maintained, item selection screens 6 are switched. As shown in FIG. 4, while the fixing operation is maintained (while the display position of the fixed key 7 is kept touched), the panel control portion 10 makes the display panel 11 display the fixed key 7 in every switched-to item selection screen 6. In each item selection screen 6, the fixed key 7 is displayed at the same position as in the screen in which the fixing operation was done. That is, no matter how item selection screens 6 are switched, the fixed key 7 is kept displayed at the same position.

Thus, while a selection key 5 for a setting item for which a user is wavering whether or not to make a setting is being fixed, the user can switch item selection screens 6 to check out what setting items are available. For example, consider a case where a user, who feels like increasing density to obtain sharper (clearer) characters than in the original, now wants to look for another related setting item. In such a case, while reserving the possible choice "Density", the user can switch item selection screens 6 to look for a related setting item. One setting item related to making characters on a printout sharper is "Sharpness".

In the examples shown in FIGS. 3 and 4, with no selection key 5 fixed, five different selection keys 5 are displayed in one item selection screen 6. Once one of those five selection keys 5 is fixed, switching to another item selection screen 6 causes four new different selection keys 5 to be displayed.

The panel control portion 10 shifts to the next display position in order the selection key 5 that would normally (with no selection key 5 fixed) be displayed at the display position of the fixed key 7. As shown in the example of item selection screens 6 in the middle and bottom tiers in FIG. 4, the selection key 5 for the setting item "Color Selection", which would be displayed at the display position of "Density" when no selection key 5 were fixed, is shifted to the position next in order to the fixed selection key 5 (the topmost position in the page-3 item selection screen 6).

Moreover, a fixed key 7 brings backward the order of the setting items following it. Accordingly, compared with when no selection key 5 is fixed, when a selection key 5 is fixed, the total number of pages of item selection screens 6 can be greater. Alternatively, all selection keys 5 of which the display position overlaps with that of the fixed selection key 5 can be extracted and the extracted selection keys 5 can be displayed together in the item selection screen 6 of the last page.

(Determining an Item Selection Screen 6 to be Displayed)

Next, with reference to FIGS. 5 and 6, a description will be given of an operation for selecting an item selection screen 6 to be displayed after a fixing operation is undone. First, based on an output from the touch panel portion 12, the panel control portion 10 recognizes that a fixing operation is undone. Specifically, when there is no touched point any longer, the panel control portion 10 recognizes that a fixing operation has been undone.

Then, according to an operation that is then done, the panel control portion 10 determines which item selection screen 6 to display. Specifically, when a prescribed first determination operation is done, the panel control portion 10 determines to display the item selection screen 6 which was being displayed when the fixing operation was undone and in which no selection key 5 is any longer fixed. On the other hand, when a prescribed second determination operation (return operation) is done, the panel control portion 10 determines to display the item selection screen 6 in which the fixing operation was done.

In this way, it is possible to determine, according to a user's operation after the undoing of a fixing operation, whether to jump to the item selection screen 6 in which the fixing operation was done or to display the item selection screen 6 that includes the selection key 5 included in the screen that was being displayed when the fixing operation was undone.

Here, the first determination operation and the second determination operation (return operation) can be defined arbitrarily. The first and second determination operations can be defined based on the direction of movement of a touched position. In the operation panel 1 according to the embodiment, based on an output from the touch panel portion 12, the panel control portion 10 recognizes as the second determination operation (return operation) an operation of, with respect to the touched position that has been maintained since a fixing operation, moving and then releasing it such that the component in a prescribed return direction is largest, and the panel control portion 10 recognizes as the first determination operation an operation of, with respect to the touched position that has been maintained since a fixing operation, moving and then releasing the finger such that the component in a direction other than the return direction is largest. In this way, it is possible to switch to a desired item selection screen 6 based only on the difference of whether or not to move a finger in a prescribed direction. The return direction can be defined arbitrarily; the description proceeds assuming that it is the leftward direction.

In this case, first, based on an output from the touch panel portion 12, the panel control portion 10 recognizes the locus of movement of the touched position (flick operation) that has been maintained since the fixing operation. Specifically, based on an output from the touch panel portion 12, the panel control portion 10 recognizes the position (coordinates) at which the touch was started and the position (coordinates) at which the finger was put back. The panel control portion 10 then finds the length (movement distance) of the straight line (locus) connecting those positions. Then, when the length found is larger than a predetermined length, the panel control portion 10 recognizes that a flick operation (the first or second determination operation) has been done. The panel control portion 10 then decomposes the locus into an upward, a downward, a leftward, and a rightward component (horizontal and vertical components). Then, when, of those components, the leftward component is the greatest, the panel control portion 10 recognizes that the second determination operation (return operation) has been done; on the other hand, when a component other than the leftward component (the upward, downward, or rightward component) is the greatest, the panel control portion 10 recognizes that the first determination operation has been done.

Figure 5:
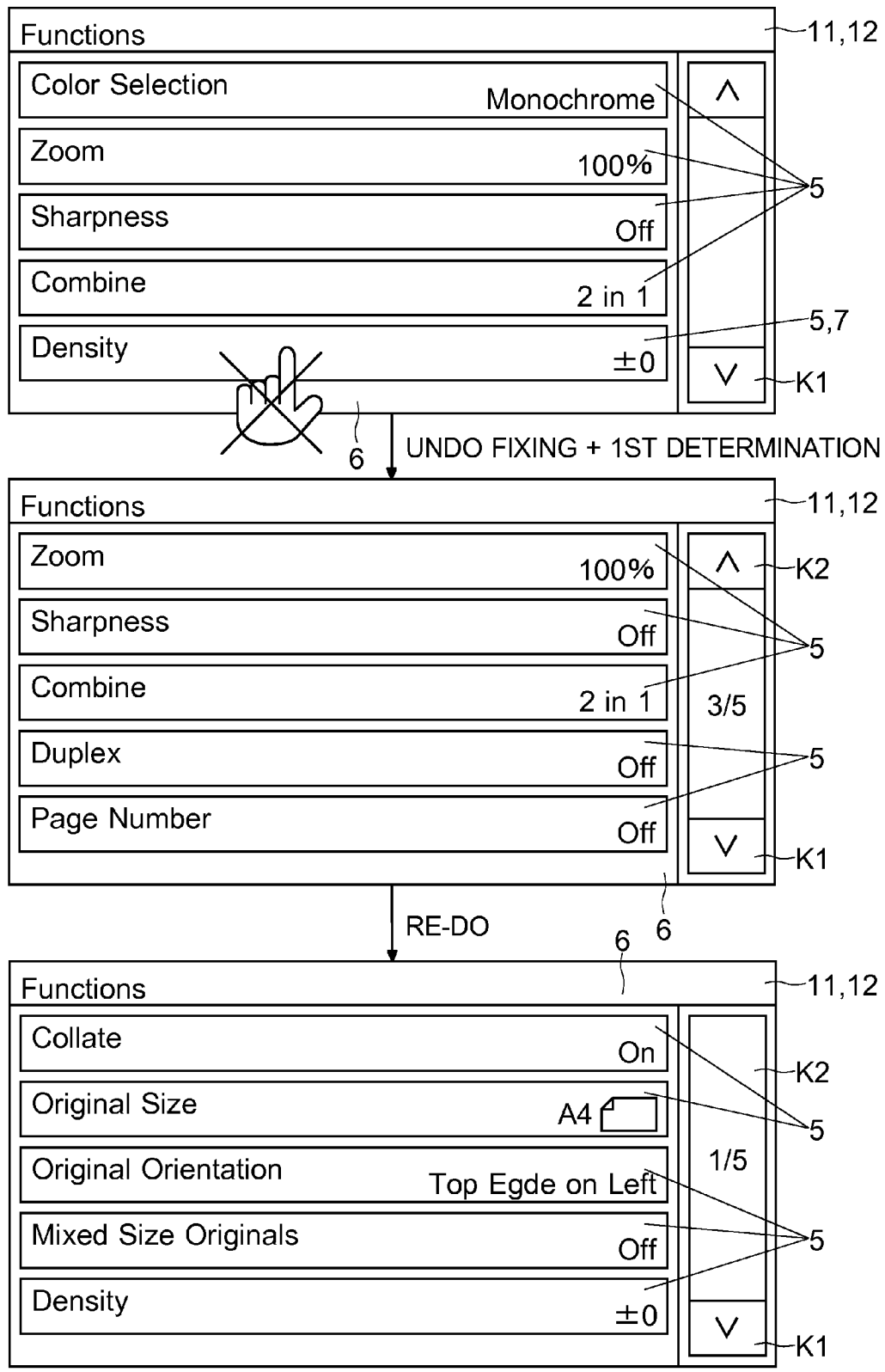
FIG. 5 is a diagram showing one example of switching of item selection screens after undoing of a fixing operation.

On recognizing that the first determination operation has been done by a gesture operation in a direction other than the leftward direction, the panel control portion 10 makes the display panel 11 display, with no key fixed, an item selection screen 6 that includes the selection keys 5 that were being displayed in the item selection screen 6 in which the fixing operation was undone (see FIG. 5, middle tier).

Fixing a key causes a shift in the display position of selection keys 5; thus, the panel control portion 10 makes the display panel 11 display, out of item selection screens 6 having no selection key 5 fixed, one that includes the most of the same selection keys 5 that were being displayed in the screen in which the fixing operation was undone. Instead, the panel control portion 10 can be configured to make the display panel 11 display, out of item selection screens 6 having no selection key 5 fixed, one that includes the least of the same selection keys 5 that were being displayed in the screen in which the fixing operation was undone.

Figure 6:
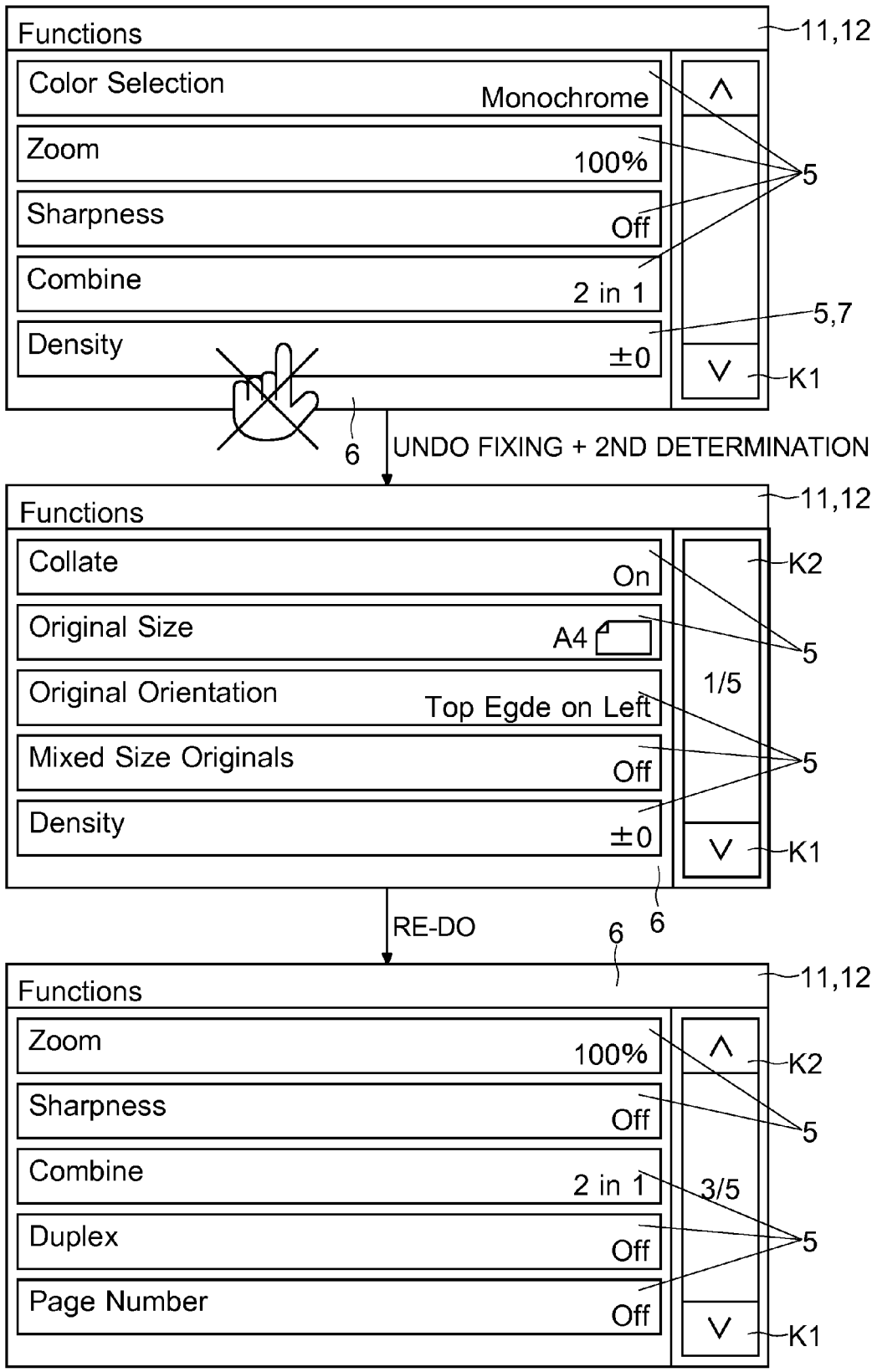
FIG. 6 is a diagram showing one example of switching of item selection screens after undoing of a fixing operation.

On the other hand, on recognizing that the second determination operation has been done by a gesture operation in the leftward direction, the panel control portion 10 makes the display panel 11 display the item selection screen 6 (the screen to which the fixed key 7 is inherently belongs) in which the fixing operation was done (see FIG. 6, middle tier).

That is, the leftward direction is defined as the return direction, and an operation in the return direction is taken as an operation to return to the original item selection screen 6

(the screen in which the fixing operation was done). It is thus possible to determine, with a simple, intuitive gesture, whether or not to return to the original item selection screen 6.

Instead, the first determination operation and the second determination operation (return operation) can be defined based on how the fixed key 7 is operated after the undoing of the fixing operation. The second determination operation (return operation) can instead be an operation of touching (tapping) the position of the fixed key 7 within a predetermined time after putting back the finger with which the fixing operation was done from the touch panel portion 12. The first determination operation can instead be an operation of touching outside the area of the fixed key 7 within a predetermined time after putting back the finger with which the fixing operation was done from the touch panel portion 12. The predetermined time can be set arbitrarily; it can be, for example, about 0.5 to several seconds.

In that case, first, based on an output from the touch panel portion 12, the panel control portion 10 recognizes the position (coordinates) of the touch made by a user before the predetermined time elapses (within the predetermined time) after the fixing operation was undone. When a touch has been made at a position outside the display region of the fixed key 7, the panel control portion 10 recognizes that the first determination operation has been done (see FIG. 5, middle tier). On the other hand, when a touch has been made in the display region of the fixed key 7 before the predetermined time elapses (within the predetermined time) after the fixing operation was undone, the panel control portion 10 recognizes that the second determination operation has been done (see FIG. 5, middle tier).

Incidentally, there can be a case where no operation is done within the predetermined time after the finger with which the fixing operation was done is put back from the touch panel portion 12. The absence of an operation can be presumed to indicate that the user is going to make a setting for the setting item corresponding to a selection key 5 in the item selection screen 6 in which the fixing operation was undone. Accordingly, when no operation is made within the predetermined time after the undoing of the fixing operation, the panel control portion 10 makes the display panel 11 display, with no selection key 5 fixed, the item selection screen 6 that includes the selection keys 5 that were being displayed when the fixing operation was undone (see FIG. 5, middle tier). In this case, the panel control portion 10 can instead make the display panel 11 display the item selection screen 6 in which the fixing operation was done.

Here, a user may select the wrong destination as the item selection screen 6 that appears after the undoing of the fixing operation. To cope with such a situation, on the operation panel 1 according to the embodiment, it is possible, by a prescribed re-do operation, to switch from the screen that has resulted from the first determination operation to the screen that would have resulted from the second determination operation, or to switch from the screen that has resulted from the second determination operation to the screen that would have resulted from the first determination operation.

Here, what operation to take as the re-do operation can be defined arbitrarily; for example, it can be an operation of touching at a plurality of (two or three) points simultaneously in the screen that has resulted from the first or second determination operation. The re-do operation can be any other kind of gesture operation.

On recognizing, based on an output from the touch panel portion 12, the prescribed re-do operation after the first determination operation (after making the display panel 11 display the item selection screen 6 that includes the selection keys 5 that were being displayed when the fixing operation was undone), the panel control portion 10 makes the display panel 11 switch to the item selection screen 6 in which the fixing operation was done (see FIG. 5, screen switching from middle tier to bottom tier). On the other hand, on recognizing, based on an output from the touch panel portion 12, the prescribed re-do operation after the second determination operation (after making the display panel 11 display the item selection screen 6 in which the fixing operation was done), the panel control portion 10 makes the display panel 11 switch to the item selection screen 6 that includes the selection keys 5 that were being displayed when the fixing operation was undone (see FIG. 6, screen switching from middle tier to bottom tier).

In this way, in a situation where a user has undone a fixing operation and switched to one screen but he has second thought and now prefers the other screen, or in a situation where a user has done the wrong operation, he can immediately switch to the other screen simply by a re-do operation. That is, even when a user makes a wrong screen switch, he can jump to the right screen by a single operation. The re-do operation can be any operation; it can be a simple operation such as a touch at two points.

(Flow of Display with a Selection Key 5 Fixed)

Figure 7:
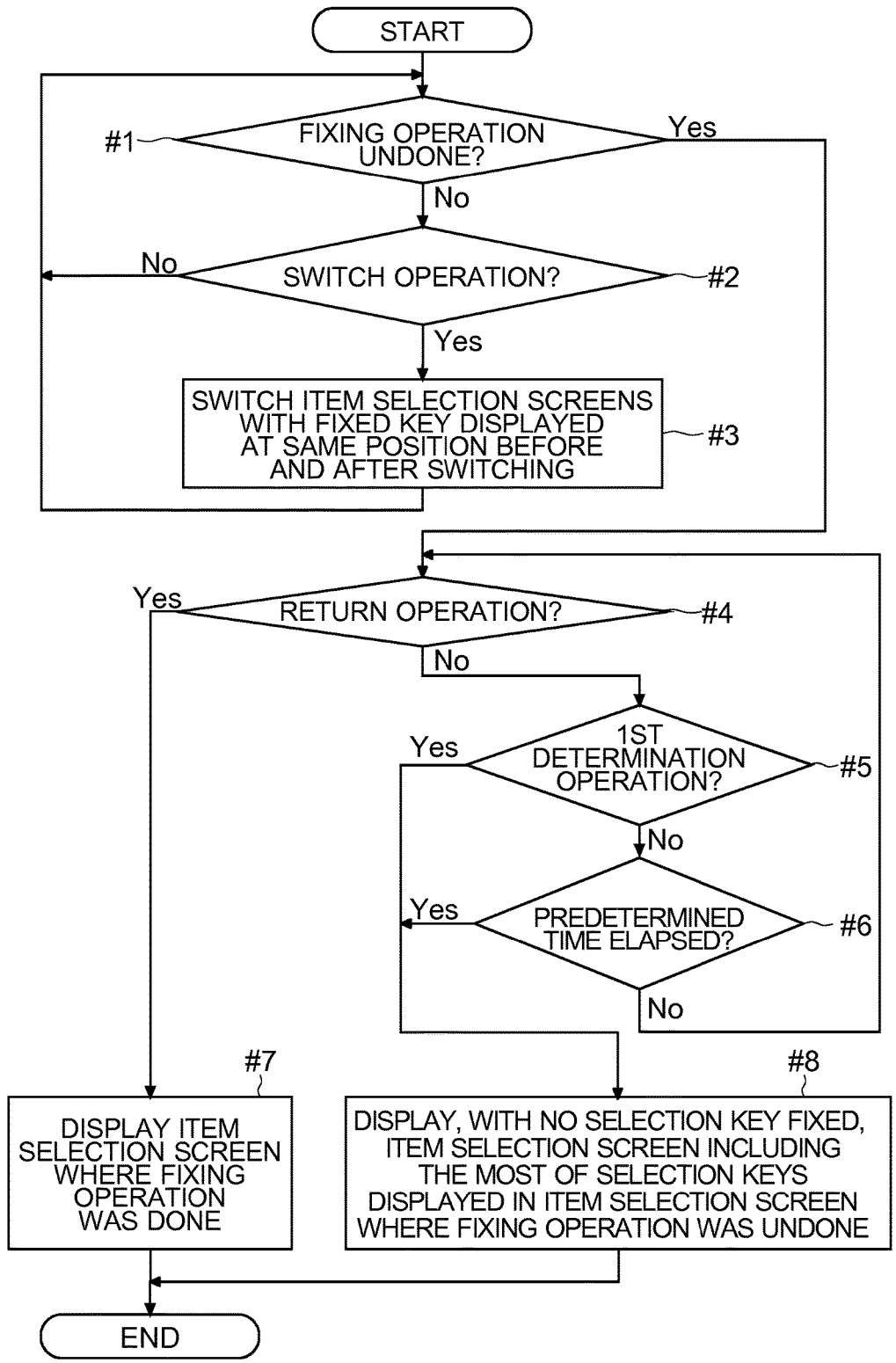
FIG. 7 is a flow chart showing one example of a flow of display with a selection key fixed on an operation panel according to one embodiment

Next, with reference to FIG. 7, a description will be given of an example of the flow of display when a selection key 5 is fixed on the operation panel 1 according to the embodiment. The flow of FIG. 7 starts when a user does a fixing operation while an item selection screen 6 related to a function such as copying or transmission is being displayed.

First, based on an output from the touch panel portion 12, the panel control portion 10 checks whether or not a fixing operation has been undone (Step #1). In other words, the operation panel 10 checks whether or not a selection key 5 is being held down so as to be fixed.

When a fixing operation is being maintained (Step #1, No), based on an output from the touch panel portion 12, the panel control portion 10 checks whether or not an operation to switch item selection screens 6 (a touch on the Next Page key K1 or the Previous Page key K2) has been done (Step #2). When no switching operation has been done (Step #2, No), the flow returns to Step #1. On the other hand, when a switching operation has been done (Step #2, Yes), the panel control portion 10 switches item selection screens 6 according to the switching operation while keeping the fixed key 7 at the same display position before and after the switching (Step #3). The flow then returns to Step #1.

When the fixing operation is undone by a flick operation or an operation of putting back a finger (Step #1, Yes), the panel control portion 10 checks whether or not a second determination operation (return operation) has been done (Step #4). When no second determination operation (return operation) has been done (Step #4, No), the panel control portion 10 then checks whether or not a first determination operation has been done (Step #5). When a first determination operation has been done, the panel control portion 10 checks whether or not a predetermined time has elapsed after the undoing of the fixing operation (Step #6). When the predetermined time has not yet elapsed (Step #6, No), the flow returns to Step #4.

When a second determination operation (return operation) has been done (Step #4, Yes), the panel control portion 10 makes the display panel 11 display the item selection screen 6 in which the fixing operation was done (Step #7). On the other hand, when a first determination operation has been done (Step #5, Yes), or when no operation has been done since the undoing of the fixing operation (Step #6, Yes), the panel control portion 10 makes the display panel 11 display, with no selection key 5 fixed, the item selection screen 6 that includes the most of the selection keys 5 that were being displayed in the item selection screen 6 in which the fixing operation was undone (Step #8). Thus, when no operation is done after the undoing of a fixing operation, it is presumed that the user will not return to the original item selection screen 6. Based on the presumption, item selection screens 6 can be switched. On completion of Step #7 or Step #8, the flow ends.

As described above, the display/input device (operation panel 1) according to the embodiment includes a display panel 11, a touch panel portion 12, and a control portion (panel control portion 10). The display panel 5 displays a plurality of kinds of item selection screens 6 including a plurality of selection keys 5 for selection of a setting item for which to make a setting. The touch panel portion 12 accepts user operation. The control portion, on recognizing based on an output from the touch panel portion 12 a prescribed switching operation being done, makes the display panel 11 display an item selection screen 6 of a different page anew. The control portion recognizes based on an output from the touch panel portion 12 a prescribed fixing operation on a displayed selection key 5 and the thereby fixed key 7, which is the selection key 5 on which the fixing operation has been done, so that, on recognizing based on an output from the touch panel portion 12 a prescribed first determination operation when the fixing operation is undone, the control portion makes the display panel 11 display, with no selection key fixed, the item selection screen 6 that includes selection keys 5 that were being displayed when the fixing operation was undone and, on recognizing based on an output from the touch panel portion 12 a prescribed second determination operation when the fixing operation is undone, the control portion makes the display panel 11 display the item selection screen 6 in which the fixing operation was done.

In this way, while a fixing operation is being done on a selection key 5 for a setting item that a user may make a setting for or the user is paying attention to, the user can look over item selection screens 6 of other pages to check out what setting items (selection keys 5) are available; the user can then undo the fixing operation and readily return to the item selection screen 6 that includes the selection key 5 that has been fixed. Thus, there is no need to switch item selection screens 6 repeatedly to and fro, and hence no need for troublesome operation. Moreover, after undoing a fixing operation, the user can choose to keep displayed the selection keys 5 that are shown in the currently displayed item selection screen 6. Thus, after fixing a selection key 5, the user can instantly call up, by a simple operation, the screen that includes the selection key 5 corresponding to the setting item for which the user wants to make setting. It is thus possible to make the display/input device (operation panel 1) more user-friendly.

The image forming apparatus (multifunction peripheral 100) incorporates the display/input device (operation panel 1) according to the embodiment. It is thus possible to provide a user-friendly image forming apparatus that permits a user easy switching to a desired screen and that saves the user from unnecessary screen switching.

The embodiment of the present disclosure specifically described above is not meant to limit the scope of the present disclosure. The present disclosure can be implemented with any modifications made within the spirit of the present disclosure.

What is claimed is:

1. A display/input device, comprising:
a display panel which displays a plurality of kinds of item selection screens including a plurality of selection keys for selection of a setting item for which to make a setting;
a touch panel which accepts user operation; and
a control portion
which includes a CPU,
which displays on the item selection screens a Next Page key for switching to an item selection screen of a next page and a Previous Page key for switching to an item selection screen of a previous page,
which, on recognizing based on an output from the touch panel a switching operation involving operating the Next Page key or the Previous Page key being done, makes the display panel display an item selection screen of a different page anew, and
which recognizes based on an output from the touch panel fixing operation involving holding down a displayed selection key for a predetermined period and a thereby fixed key, such that the display position of the key is fixed, and
which recognizes on recognizing based on an output from the touch panel a prescribed first determination operation or a prescribed second determination operation when the fixing operation is undone, so that
when the first determination operation is done as the fixing operation is undone, the control portion makes the display panel display, with no selection key fixed, an item selection screen that includes selection keys that were being displayed when the fixing operation was undone and,
when the second determination operation is done as the fixing operation is undone, the control portion makes the display panel display an item selection screen of the page in which the fixing operation was done.

2. The display/input device of claim 1, wherein
on recognizing based on an output from the touch panel portion that the switching operation has been done while the fixing operation is being maintained, the control portion makes the display panel display the item selection screen of the different page such that the fixed key is displayed at a same display position as in the item selection screen in which the fixing operation was made.

3. The display/input device of claim 2, wherein
when the switching operation has been done while the fixing operation is being maintained, the control portion
makes the display panel display the item selection screen of the different page newly, and
shifts a display position of the selection key that overlaps with a display position of the fixed key.

4. The display/input device of claim 2, wherein
based on an output from the touch panel portion, the control portion
recognizes as the second determination operation an operation of touching a display region of the fixed key within a predetermined time after the fixing operation being undone, and
recognizes as the first determination operation an operation of touching outside the display region of the fixed key within a predetermined time after the fixing operation being undone.

5. The display/input device of claim 2, wherein
based on an output from the touch panel portion, the control portion
recognizes a locus of movement of a touched position from a position at which a touch by the fixing operation was started to a position at which a finger was put back,
decomposes the locus into an upward, a downward, a leftward, and a rightward component,
recognizes that the first determination operation has been done when, of those components, a component other than a component in a prescribed return direction is greatest, and
recognizes that the second determination operation has been done when a component in the return direction is greatest.

6. The display/input device of claim 1, wherein
based on an output from the touch panel portion, the control portion recognizes as the fixing operation an operation of holding down a displayed selection key.

7. The display/input device of claim 1, wherein
on recognizing based on an output from the touch panel portion that a prescribed re-do operation is done after the first determination operation, the control portion makes the display panel display the item selection screen in which the fixing operation was done, and
on recognizing based on an output from the touch panel portion that the re-do operation is done after the second determination operation, the control portion makes the display panel display the item selection screen that includes the selection keys that were being displayed when the fixing operation was undone.

8. The display/input device of claim 1, wherein
when no operation is done within a predetermined time after the fixing operation being undone, the control portion makes the display panel display the item selection screen that includes the selection keys that were being displayed when the fixing operation was undone.

9. An image forming apparatus comprising the display/input device of claim 1.

10. A method for controlling a display/input device, comprising:
displaying a plurality of kinds of item selection screens including a plurality of selection keys for selection of a setting item for which to make a setting;
accepting user operation;
displaying on the item selection screens a Next Page key for switching to an item selection screen of a next page and a Previous Page key for switching to an item selection screen of a previous page;
on recognizing a switching operation involving operating the Next Page key or the Previous Page key being done, displaying an item selection screen of a different page anew;
recognizing a fixing operation involving holding down a displayed selection key for a predetermined period and a thereby fixed key, such that the display position of the key is fixed;
recognizing a prescribed first determination operation or a prescribed second determination operation when the fixing operation is undone;
when the first determination operation is done as the fixing operation is undone, displaying, with no selection key fixed, an item selection screen that includes selection keys that were being displayed when the fixing operation was undone; and
when the prescribed second determination operation is done as the fixing operation is undone, displaying an item selection screen of the page in which the fixing operation was done.

* * * * *